United States Patent
Belzner

(10) Patent No.: US 9,599,018 B2
(45) Date of Patent: Mar. 21, 2017

(54) METHOD AND DEVICE FOR SAFELY OPERATING A GAS TURBINE PLANT

(71) Applicant: ALSTOM Technology Ltd, Baden (CH)

(72) Inventor: Andreas Belzner, Bad Säckingen (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 260 days.

(21) Appl. No.: 14/499,602

(22) Filed: Sep. 29, 2014

(65) Prior Publication Data

US 2015/0013343 A1   Jan. 15, 2015

Related U.S. Application Data

(63) Continuation of application No. PCT/EP2013/056361, filed on Mar. 26, 2013.

(30) Foreign Application Priority Data

Mar. 30, 2012  (EP) .................................. 12162566

(51) Int. Cl.
*F02C 9/00*    (2006.01)
*F02C 7/00*    (2006.01)
(Continued)

(52) U.S. Cl.
CPC ................ *F02C 7/00* (2013.01); *F01D 21/14* (2013.01); *F02C 9/00* (2013.01); *F02C 9/28* (2013.01); *F02C 9/46* (2013.01); *F05B 2270/304* (2013.01)

(58) Field of Classification Search
CPC .... F01D 21/14; F02C 9/00; F02C 9/26; F02C 9/28; F02C 9/46; F05B 2270/304
(Continued)

(56) References Cited

U.S. PATENT DOCUMENTS

2003/0056492 A1* 3/2003 Henson ................... F01D 25/26
                                                                                60/39.281
2005/0109038 A1   5/2005 Matthews
(Continued)

FOREIGN PATENT DOCUMENTS

CN           101592085 A    12/2009

*Primary Examiner* — Steven Sutherland
(74) *Attorney, Agent, or Firm* — Buchanan Ingersoll & Rooney PC

(57) ABSTRACT

A method and a device are disclosed for the safe operation of a gas turbine plant, whose operation is both controlled by at least one process controller, which at least triggers and/or influences operationally relevant processes of the gas turbine plant, and is also monitored by a separate protection unit that is operated independently of the process controller on the basis of at least one first limit value for a safety-relevant operating parameter, wherein the gas turbine plant is subjected to an emergency switch-off once the at least one first limit value is exceeded. In that in the case of a defined transient operating state of the gas turbine plant that can be detected by the protection unit, the at least one first limit value of the safety-relevant operating parameter is raised to a second limit value, wherein the gas turbine plant is protected by an emergency switch-off of the gas turbine plant once said second limit value is exceeded. Furthermore, secondary protective functions can be carried out in the process controller.

20 Claims, 1 Drawing Sheet

(51) Int. Cl.
*F01D 21/14* (2006.01)
*F02C 9/28* (2006.01)
*F02C 9/46* (2006.01)

(58) Field of Classification Search
USPC .......................................................... 60/779
See application file for complete search history.

(56) References Cited

U.S. PATENT DOCUMENTS

2005/0217273 A1   10/2005  Muramatsu et al.
2006/0225403 A1   10/2006  Tsuzuki et al.
2007/0005219 A1    1/2007  Muramatsu et al.
2011/0318169 A1*  12/2011  Zheng ................... F01D 11/025
                                                      415/169.1

* cited by examiner

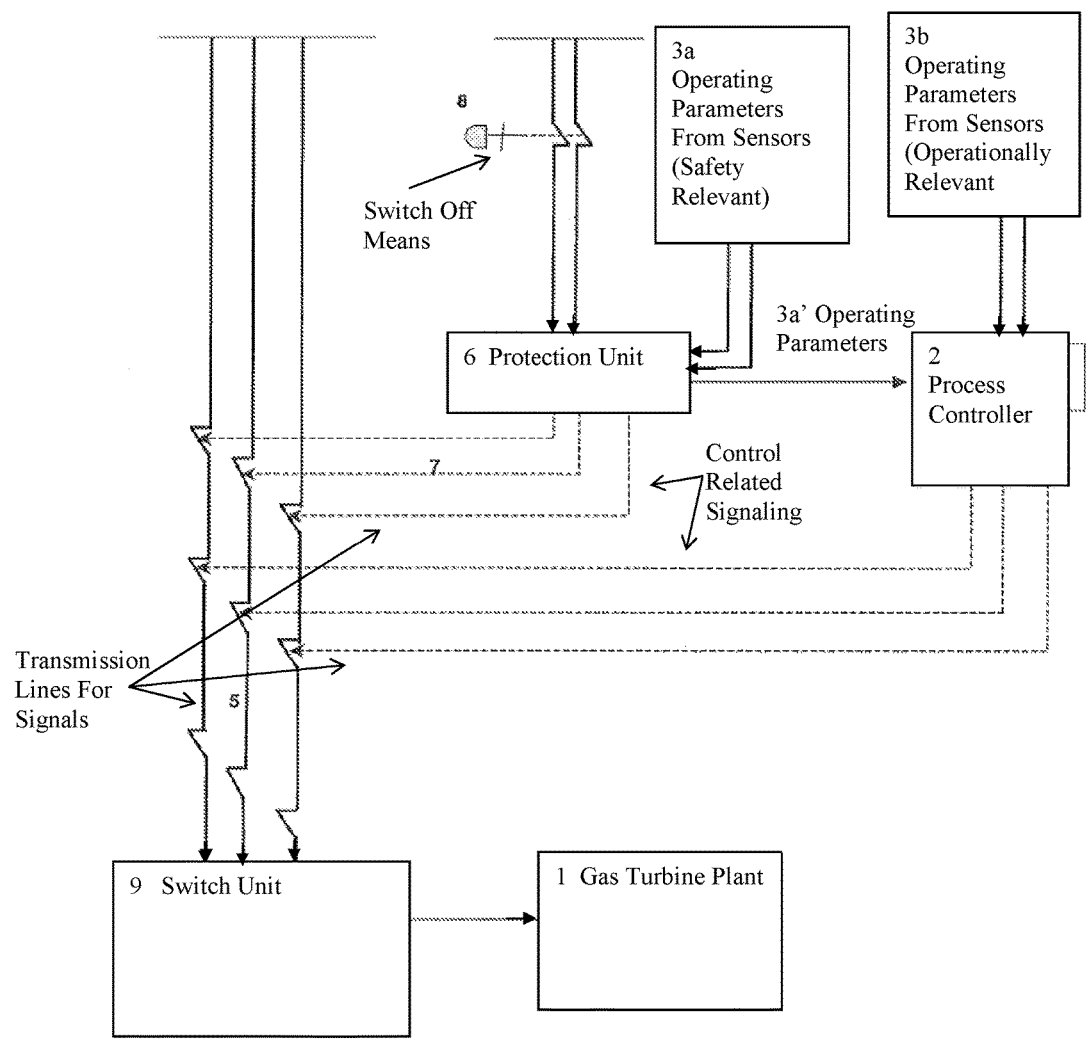

METHOD AND DEVICE FOR SAFELY OPERATING A GAS TURBINE PLANT

CROSS-REFERENCE TO RELATED APPLICATIONS

This application claims priority to PCT/EP2013/056361 filed Mar. 26, 2013, which claims priority to European application 12162566.9 filed Mar. 30, 2012, both of which are hereby incorporated in their entireties.

TECHNICAL FIELD

The disclosure refers to a method and a device for the safe operation of a gas turbine plant, whose operation is both controlled by at least one process controller, which triggers and/or influences operationally relevant processes of the gas turbine plant, and is also monitored by a protection unit that is separate and operated independently of the process controller based on at least one first limit value for a safety-relevant operating parameter, wherein the protection unit performs an emergency switch-off of the gas turbine plant once this exceeds at least a first limit value.

BACKGROUND

The operation of gas turbine plants is subject to high safety requirements, which are specified in international standards, such as e.g. the IEC 61508 set of standards, in which the functional safety of safety-related electronic systems is specified and the application of functional safety methods for preventing systematic faults and for safe control of system failures or system faults is described in detail. An auxiliary standard IEC 61511 building on the above standard is concerned with the functional safety of technical safety systems for the process industry, which also includes the operation of gas turbine plants.

A significant aspect of functional safety during the operation of safety-relevant process industry plants, which is primarily raised below in relation to the operation of gas turbine plants, relates to the strict separation between technical process control aspects, which relate to the smooth operation of all components of the gas turbine plant, and safety monitoring tasks, which ensure that the gas turbine plant is subjected to an emergency switch-off in the event of technical faults within the gas turbine plant prevailing upon exceeding a significant hazard potential for the gas turbine plant and especially for its surroundings. The relevant set of standards for the safe operation of process plants requires complete functional independence between the protection unit carrying out the protective function and a process controller carrying out the process control tasks of a gas turbine plant. Therefore the process controller of a gas turbine plant may not prevent the protection unit from fulfilling its protective function in any case. This especially applies to human interventions in the process control, which may have no influence on the functionality of the protection unit during the commercial operation of a gas turbine.

Where e.g. protecting the gas turbine plant against excessive shaft rotation speeds is concerned, this only requires monitoring of the shaft rotation speed and the specification of a maximum permissible limit value for the shaft rotation speed, which, on being exceeded, results in a potential hazard for the surroundings of the gas turbine plant. In such a case the protection unit provides an emergency switch-off of the gas turbine plant without the interposition of and interrogation of other system components, in order to protect said plant and the surroundings against damage.

However, said normative independence requirements for the operation of gas turbine plants especially conflicts with typical conditions for gas turbine plant construction. On the one hand, the safety criteria that can be pre-set in the protection unit do not generally apply to every protective function, but can depend on each individual gas turbine plant. This means, however, that access to the computer-based protection unit has to be provided at least during the commissioning of gas turbine plants, in order to be able to set up and adjust the functionality of the protection unit individually in this way, e.g. by suitably qualified personnel.

Moreover, during the operation of gas turbine plants, particular operating states occur in which e.g. controlling valve positions must be assessed as being entirely correct, which would, however, immediately result in an increased hazard potential in a different operating situation. Such operating states primarily relate to so-called transient operating states, in which the gas turbine plant is changed from a first operating state into a second operating state. Transient operating states occur e.g. when starting or changing the load of the gas turbine plant, during which e.g. changes in the fuel supply are carried out. In order to also correctly represent such operating states and operating state changes and to positively detect a potential hazard using a protection unit, a number of items of status information are required that can be detected by sensors from the gas turbine plant, which can also require complex evaluation logic. However, such an approach conflicts with the desire for very simple evaluation logic and monitoring capability of the protection unit. Moreover, for competition reasons, the necessary costs for the protection function tasks should also be kept very low.

SUMMARY

The object of the disclosure is to develop a method and a device for the safe operation of a gas turbine plant, whose operation is both controlled by at least one process controller, which at least triggers and/or influences operationally relevant processes of the gas turbine plant and is also monitored by a protection unit that is separate from and operated independently of the process controller, based on at least one first limit value for a safety-relevant operating parameter (also referred to as a protection-relevant operating parameter or a safety-relevant operating variable), wherein the gas turbine plant is subjected to an emergency switch-off once the at least one first limit value is exceeded, such that the normatively required protective function for the operation of gas turbine plants can be implemented and this can be achieved with technically as simple as possible simple and inexpensive means. In particular, it is important that the requirement for complete independence between the protection unit and the process controller is fulfilled, so that it is always ensured that the functionality of the protection cannot be disabled by the process controller.

The process control can e.g. be achieved by at least one closed control loop. With the closed control loop, at least one control variable, such as e.g. the power, a pressure or a temperature of the gas turbine process is controlled to a target value. Here the process controller receives signals from sensors that directly or indirectly determine the control variables of the system and calculates the control signals for actuators that directly or indirectly influence the control variables. This can e.g. be a control signal for an actuator for a fuel controlling valve for influencing a hot gas temperature or exhaust gas temperature, or e.g. a control signal for an actuator for adjustable compressor blades, in order to control the induction flow rate of the compressor and thus to influence a pressure or a temperature. The target value can depend on the operating conditions of the gas turbine. The protection unit, also referred to as a protection computer, receives signals from sensors that measure or determine the protection-relevant variables directly (e.g. an exhaust gas temperature) or indirectly (e.g. a hot gas temperature, which is approximated as a function of the exhaust gas temperature and of the pressure ratio across the turbine) and triggers a protective function, typically an emergency switch-off or fast load relief of the gas turbine, when a limit value for the protection-relevant variable is exceeded. The emergency switch-off can e.g. be carried out by closing a quick-action valve (also known as a trip valve), with which the fuel supply to the gas turbine is stopped.

The solution for the object of the disclosure is given in claim 1. The subject matter of claim 8 is a device according to the solution for the safe operation of a gas turbine plant. The features developing the idea according to the solution are specified in the dependent claims and can be found in the further description, especially with reference to exemplary embodiments.

According to the solution, a method for the safe operation of a gas turbine plant according to the features of the preamble of claim 1 is characterized in that in the case of a transient operating state of the gas turbine plant, in which the gas turbine plant is changed from a first operating state into a second operating state, said transient state can be detected by the protection unit using a suitably selected process signal, and by raising the at least one first limit value of the safety-relevant operating parameter to a second limit value, wherein the gas turbine plant, once said second limit value is exceeded, is protected by an emergency switch-off of the gas turbine plant, without said protection being able to be influenced or disabled by an output signal of the process controller.

For example, the second limit value of the respective safety-relevant operating parameter is used for a period of time in which control processes of individual control elements of the gas turbine plant are carried out.

The system-relevant functional influence on all components of the gas turbine plant by the process controller, which ensures smooth plant operation, is carried out in a known manner. For this purpose, all gas turbine-specific processes that run in the different components of the gas turbine plant are system-specifically adapted to each other. This presupposes accurate knowledge about plant-specific operating variables, which are detected using a number of sensors provided in the gas turbine plant and that are fed to the process controller for further evaluation and assessment.

Within the scope of process control, the control and regulation of operationally relevant process variables, whose monitoring is performed by operational safety logic stored in the process controller, are carried out based on a specified control logic, which can be accessed depending on the situation even during the operation of the gas turbine plant, e.g. by operating staff, i.e. the smooth operation of a gas turbine plant is monitored by the process controller itself. This enables hardware faults occurring in the system components of the gas turbine plant, e.g. during valve positioning or while metering air or fuel delivery quantities etc., to be detected in a timely manner and suitable countermeasures to be taken. Such corrections can be resolved by the process controller to eliminate small faults that are only associated with a low risk potential. By contrast, if there are erroneous command inputs by operating staff or systematic faults occurring in the control logic, then such hazard situations connected to a high risk potential for the gas turbine plant and its surroundings cannot be detected, or cannot be detected to a sufficient extent, by the safety logic implemented in the process controller. Such operating states associated with a high potential risk or hazard are to be detected by the separately provided protection unit and are to be alleviated accordingly, e.g. by an emergency switch-off of the gas turbine plant.

For assessing the actual existing hazard potential of the operational gas turbine plant, it is necessary that at least one safety-relevant operating parameter of the gas turbine plant is made directly available to the protection unit, i.e. the at least one safety-relevant operating parameter directly detected by sensors at the gas turbine plant is directly fed to the protection unit.

In a particularly preferred manner, the following measurement variables are detected as safety-relevant operating parameters of the gas turbine plant: rotation speed of the shaft, vibrations occurring on the shaft, amplitude and/or frequency of combustion chamber pulsations and process temperatures within respective components of the gas turbine plant, that is e.g. compressor outlet temperature, combustion chamber temperature, gas turbine outlet temperature, to name only some.

A particular class of safety-relevant operating parameters are the valve positioning signals, especially of fuel controlling valves (continuous position indication or binary end switch signals). Said parameters only indirectly indicate the hazard potential of an operating situation, in combination with each other or with other operating parameters. The hazard potential is detected by means of logical conclusions. Thus, for example, the lack of the position message "closed" of a fuel shutoff valve with the simultaneous absence of a flame signal from the combustion chamber indicates the hazard situation that fuel is flowing into the turbine and is propagating in the process path unburnt and can mix with air to form an explosive mixture.

If at least one safety-relevant operating parameter monitored by the protection unit exceeds a first limit value that is associated therewith and that is stored in the protection unit, then the gas turbine plant is in a state with a significantly high hazard potential for the gas turbine plant itself and its surroundings, so that the protection unit generates a signal with which the gas turbine plant is subjected to an emergency switch-off.

If the gas turbine plant is, however, in a transient operating state, which e.g. occurs when starting the gas turbine or in the event of a load change, then the safety-relevant operating parameters also undergo significant changes in magnitude, which in some cases results in a limit value being exceeded within the protection unit, as a result of which the gas turbine plant would be subjected to an emergency switch-off for its protection. In these cases, exceeding the limit value does not yet directly indicate a hazard, because the excess is limited in time from the outset by the operating logic and because, with a correct design of the transient process, a hazard situation cannot develop in said time. Exceeding the limit value can thus be tolerated briefly, possibly with checking of additional boundary conditions. In these cases a safety switch-off would prevent continuous operation of the gas turbine plant.

In order to avoid such emergency switch-offs during transient operating states, the method according to the solution provides a temporary raising of the at least one limit value only stored in the protection unit for the operating case in which the gas turbine plant is in a transient operating state. In the case of binary positioning signals for process valves, the "raising of the limit value" is to be understood to be lifting or relaxing the logic conditions for triggering the switch-off signal.

By means of raising the at least one limit value with which the respective sensor-detected safety-relevant operating parameter is compared only for the time period of a transient operating state, the restrictiveness with which the protection unit monitors the safety of the gas turbine plant is temporarily reduced, so that transient operating states of a gas turbine plant can be carried out without interruptions. For determining whether a transient operating state exists, the process controller is not used because it may not be possible to prevent triggering of the protective action by output signals of the process controller itself or by manipulation by the condition staff.

A transient operating state can be detected by the protection unit in one of the following ways:
- by a suitably selected process signal that reaches a defined value or exceeds a limit value, or as described further above, possibly by forming gradients. Transient states that are relevant to shaft oscillations can be detected with low logic complexity, for example, by the evaluation of the time profile of the shaft speed.
- by an "impermissible" signal combination (e.g. of valve positions) only appearing and disappearing again within a time limited tolerance window (see the explanation above). In this case the protection unit detects that a transient operating state exists and omits triggering of the protective reaction for a predetermined time window. Said "detection" may be supported by additional logic restrictions—e.g. by a limitation of the frequency with which such tolerance windows can be allowed.

A significant feature of the disclosure is that a secondary protective function can be implemented in the process controller. In any case, all sensor-detected operating parameters relevant to control are available to the process controller, which prove the existence and the duration of a transient operating state beyond doubt by suitable evaluation. Said detection of the operating state is in any case already configured by running certain sequences in the software. The current operating state is uniquely determined by the current step in the currently running operating sequence. This means that the "additional protection in the process controller" can be accurately adapted to the provided operation, and in the event of transient operating states, the process controller can respond to deviations faster than the actual protection unit. This means that the protection in the process controller operates without or with a shorter time delay. In addition, a temporary increase of the limit value can e.g. be manually adapted to the current conditions. Said secondary protection is under all circumstances only an additional protection to the primary protective function of the protection unit and cannot disable the same.

This means that the secondary protective function in the process logic can be stricter in its protection criteria than the primary protective function in the protection unit. Limit values for the triggering of protective actions can be placed closer to the operating window than is required for an individual machine. This means the difference between the value of a monitored variable (e.g. temperature, pressure, vibration, pulsation or rotation speed etc.) at which a protective function is triggered in the process logic and the values that are to be expected in normal operation of the gas turbine can be selected to be smaller than the difference between the value of the same monitored variable at which a protective function is triggered in the protection unit and the values that are to be expected in normal operation of the gas turbine. It is possible to allow the parameters of the secondary protective function to be adjusted during the commissioning of each machine with individual adjustments by the commissioning staff. Tolerance times for the occurrence of potentially hazardous valve positions can be coupled timewise and logically to the operational sequence directly, because all the information is available in the process controller about whether the machine is in a transient operating sequence and exactly which step it is in at each specified point in time.

However, it remains to note that the secondary protective function of the process controller is less reliable. They are furnished with less "safety integrity" than the primary protective functions in the protection unit because it is exposed to potential faults (see above) of the operating logic and can especially also be influenced by decisions of the operating staff. Therefore the independent protection unit is indispensable. Said protection unit is autonomous, i.e. it cannot be influenced externally during operation. In particular, the limit values of the protection unit cannot be influenced either by the process controller or by means of input means such as a keyboard, a touch screen or other man-machine interfaces. The protection-relevant limit values can also not be directly influenced by the input of command signals, such as e.g. the specification of a target power or the selection of a defined operating mode (fuel selection, frequency support, peak power or similar). The limit values of the protection unit can typically only be influenced by the actual operating state of the gas turbine, e.g. a different limit value for a hot gas temperature can be specified in the protection unit for operation with oil rather than for operation with gas.

For example, for the case of monitoring vibrations occurring on the shaft of the gas turbine plant by the protection unit, the second limit value that is set higher in this respect can tolerate vibration levels that would inevitably result in machine damage if the vibration levels would persist over a longer period of time. However, because the gas turbine is in a transient operating state in this case, it is assumed from this that the increased shaft vibrations only occur temporarily, so that the protection unit does not generate a signal for emergency switch-off in this case. In order to detect that the gas turbine is in a transient operating state, in this case the gradient of the rotation speed can be formed in the protection unit. Furthermore, the absolute rotation speed can be taken into account when specifying the limit value. By contrast, if vibrations occur on the shaft during a determined transient operating state that can result in destruction of the gas turbine plant and an associated high risk to the surroundings, then the higher set second limit value would be exceeded and the gas turbine plant would be subjected to an emergency switch-off for its protection.

Moreover, valve position combinations can occur during transient operating states that would lead to an increased hazard potential in a normal operating state of the gas turbine plant. For example, in this way, explosive gases or gas mixtures that could lead to an explosion could accumulate in unprotected gas turbine regions. However, because of the only short-duration valve position combination, an associated risk potential is acceptably low, so that significant risks to the machine or surroundings could be excluded. In order to avoid the protection unit detecting such a hazardous valve position combination during a transient operating state as a trigger event for the emergency switch-off of the gas turbine plant, the protection unit imposes a time delay within which the protection unit classes such a valve position combination that should be classified as hazardous as tolerable. In this connection, the first limit value, which includes a time span for the case of the transient operating state, is raised to a second, higher limit value, i.e. a longer time span, in which the protection unit does not generate an emergency signal despite a detected hazardous valve position.

The change of one or more valve positions in the protection unit can be used here as triggering for detecting a transient operating state.

The method, according to the solution outlined above, can be carried out with a device that generates signals that at least influence and/or trigger operationally relevant processes in the gas turbine plant for the safe operation of a gas turbine plant with at least one process controller and with a protection unit separate from the process controller that is based on at least a first limit value for a safety-relevant operating parameter, and which performs an emergency switch-off of the gas turbine upon the first limit value being exceeded. The device according to the solution is characterized in that a sensor unit is provided that detects protection-relevant operating parameters of the gas turbine, which are fed to the protection unit, and that the protection unit comprises logic with which it can detect certain transient operating states, i.e. transition states from a first operating state into a second operating state. The protection unit has a means that raises a first limit value to a second, higher limit value. It changes from the first limit value to the second limit value once the logic has detected a defined transient operating state. Furthermore, the protection unit comprises an interface to the sensor unit, via which at least one sensor-detected operating variable corresponding to a safety-relevant operating parameter can be directly transferred, i.e. without interconnection of the process controller. Finally, the protection unit can perform an emergency switch-off of the gas turbine on the second limit value being exceeded.

BRIEF DESCRIPTION OF THE DRAWINGS

Preferred embodiments of the disclosure are described below using the figures, which are only used for explanation and are not to be interpreted restrictively. In the figures, FIG. 1 shows a device for the safe operation of a gas turbine plant.

DETAILED DESCRIPTION

In FIG. 1, all those components that are necessary for the safe operation of a gas turbine plant 1 are schematically illustrated. First of all, the gas turbine plant 1 is to be operated in an operationally compliant manner using a computer-based process controller 2. For this purpose, operationally relevant process and operating parameters 3b detected by sensors on the gas turbine 1 that are only necessary for process control, as well as all operating parameters 3a' that are both protection-relevant and also necessary for process control, are fed to the process controller 2 for further assessment and analysis. The process controller 2 generates control signals that are fed via signal lines (not shown) to the individual components of the gas turbine plant 1.

In addition, a protection unit 6 that is also in the form of a standalone process computer is provided separately from and independently of the process controller 2. The protection unit 6 receives operating parameters 3a detected by sensors that represent safety-relevant operating parameters directly from the respective sensors provided on the gas turbine plant 1.

Within the protection unit 6, in each case a comparison of the at least one safety-relevant operating parameter with a first limit value takes place. In the case in which the first limit value is exceeded, the protection unit 6 transmits a signal via lines 7 and 5 that immediately results in an emergency switch-off of the gas turbine plant 1. Safety-relevant operating parameters 3a' that are also necessary for process control are transferred from the protection unit 6 to the process controller 2.

In order to avoid the gas turbine plant 1 being subjected to an emergency switch-off by the protection unit 6 within a transient operating state because of the restrictively specified first limit values, the limit values stored in the protection unit 6 are raised to respective higher limit values only during such a transient operating state. In this way the safety policy stored in the protection unit 6 is softened. The detection of a transient operating state is carried out by the protection unit 6 based on the safety-relevant operating parameters 3a fed to it, and the protection unit contains internal logic for detecting defined transient operating states. In the exemplary embodiment illustrated in FIG. 1, the protection unit 6 moreover comprises a safety emergency switch-off means 8, which may optionally be manually operated.

A switch unit 9 that generates an emergency switch-off signal if two of the three signal lines 5 are interrupted is preferably interconnected immediately before the gas turbine plant 1.

The invention claimed is:

1. A method for safe operation of a gas turbine plant, whose operation is both controlled by a process controller, which at least triggers and/or influences operationally relevant processes of the gas turbine plant, and is also monitored by a protection unit that is separate from the process controller and is operated independently of the process controller based on at least a first limit value for a safety-relevant operating parameter, the first limit value configured such that the gas turbine plant is subjected to an emergency switch-off by the protection unit once the first limit value is exceeded, the method comprising:
   in response to detecting that the gas turbine plant is operated in a transient operating state in which the gas turbine plant is changed from a first operating state into a second operating state, raising the first limit value of the safety-relevant operating parameter to a second limit value such that the gas turbine plant is protected by an emergency switch-off of the gas turbine plant once said second limit value is exceeded and no emergency switch-off of the gas turbine plant occurs when the first limit value is exceeded and the second limit value is not exceeded during the transient operating state.

2. The method according to claim 1, wherein the safety-relevant operating parameter, with which a first and second limit value are respectively associated, is one of: rotation speed of a shaft of the gas turbine plant, vibrations of a shaft of the gas turbine plant, amplitude and/or frequency of combustion chamber pulsations of the gas turbine plant, temperatures to which components of the gas turbine plant are exposed, and valve positions in combination with each other or with other operating parameters.

3. The method according to claim 1, wherein the second limit value is selected to ensure that the gas turbine plant is subjected to an emergency switch-off by the protection unit on reaching a hazard potential that is classified as hazardous for surroundings of the gas turbine plant.

4. The method according to claim 1, wherein command signals, by means of which influence can be exerted on the process controller, are fed to the process controller via at least one input means during the operation of the gas turbine plant, and that the protection unit operates autonomously and without any input means in this respect.

5. The method according to claim 1, wherein the second limit value is set for a time period that is defined to permit the gas turbine plant to operate in the transient state so that the gas turbine plant passes through the transient state during a load change without interruption unless the second limit value is exceeded.

6. The method according to claim 1, comprising:
the protection unit performing the emergency switch off in response to determining that the second limit value is exceeded while the gas turbine plant is operated in the transient state.

7. The method according to claim 1, comprising:
the protection unit performing the emergency switch off in response to determining that the first limit value is exceeded while the gas turbine plant is not operating in the transient state.

8. The method of claim 1, wherein the protection unit is a process computer and the process controller comprises a computer.

9. A method for safe operation of a gas turbine plant, whose operation is both controlled by a process controller, which at least triggers and/or influences operationally relevant processes of the gas turbine plant, and is also monitored by a protection unit that is separate from the process controller and is operated independently of the process controller based on a first limit value for a safety-relevant operating parameter, the first limit value configured such that the gas turbine plant is subjected to an emergency switch-off by the protection unit once the first limit value is exceeded, wherein in the case of a transient operating state of the gas turbine plant that is detectable by the protection unit, in which the gas turbine plant is changed from a first operating state into a second operating state, the first limit value of the safety-relevant operating parameter is raised to a second limit value, wherein the gas turbine plant is protected by an emergency switch-off of the gas turbine plant once said second limit value is exceeded; and
wherein the second limit value of the safety-relevant operating parameter is applied for a specified time span, in which the transient operating state of the gas turbine plant can be passed through without interruption.

10. The method according to claim 9, wherein the safety-relevant operating parameter is one of: rotation speed of a shaft of the gas turbine plant, vibrations of a shaft of the gas turbine plant, amplitude and/or frequency of combustion chamber pulsations of the gas turbine plant, temperatures to which components of the gas turbine plant are exposed, and valve positions in combination with each other or with other operating parameters.

11. The method according to claim 9, wherein the transient state occurs during a load change.

12. A method for safe operation of a gas turbine plant, whose operation is both controlled by a process controller, which at least triggers and/or influences operationally relevant processes of the gas turbine plant, and is also monitored by a protection unit that is separate from the process controller and is operated independently of the process controller based on a first limit value for a safety-relevant operating parameter, the first limit value configured such that the gas turbine plant is subjected to an emergency switch-off by the protection unit once the first limit value is exceeded, wherein in the case of a transient operating state of the gas turbine plant that is detectable by the protection unit, in which the gas turbine plant is changed from a first operating state into a second operating state, the first limit value of the safety-relevant operating parameter is raised to a second limit value, wherein the gas turbine plant is protected by an emergency switch-off of the gas turbine plant once said second limit value is exceeded; and
the process controller determining the operating state of the gas turbine plant based on operating parameters detected by sensors of the gas turbine plant and detects whether the gas turbine plant is in the transient operating state or not, and depending on the operating state determined by the process controller, but independently of the protection unit, carries out a protective load reduction or an emergency switch-off of a gas turbine upon operating limits being exceeded.

13. The method according to claim 12, wherein the operating limits of the operating parameters, with which a protective load relief or emergency switch-off of the gas turbine is carried out in the process controller upon the operating limits being exceeded, are closer to values that monitored operating parameters reach during normal operation of the gas turbine than any limit values of the protection unit.

14. The method according to claim 12, wherein the safety-relevant operating parameter is one of: rotation speed of a shaft of the gas turbine plant, vibrations of a shaft of the gas turbine plant, amplitude and/or frequency of combustion chamber pulsations of the gas turbine plant, temperatures to which components of the gas turbine plant are exposed, and valve positions in combination with each other or with other operating parameters.

15. The method according to claim 12, wherein the transient state occurs during a load change.

16. A device for the safe operation of a gas turbine plant with a process controller that generates signals that at least trigger and/or influence operationally relevant processes in the gas turbine plant, and with a protection unit that is separate from the process controller, which has an interface to a sensor unit via which a safety-relevant operating parameter detectable by a sensor is directly transferrable, wherein at least a first limit value forms a basis for evaluating the safety-relevant operating parameter and the protection unit performs an emergency switch-off of the gas turbine plant upon the first limit value being exceeded when the gas turbine plant is operating in a non-transient state, wherein a signal line for transferring a safety-relevant operating parameter and a control-relevant operating parameter leads from the protection unit to the process controller and that the protection unit comprises logic for analyzing the safety-relevant operating parameter to detect a transient state of the gas turbine plant and, upon detecting the transient state, increases the first limit value to a second limit value so that the protection unit performs an emergency switch-off of the gas turbine plant upon the second limit value being exceeded during the transient state and does not perform an emergency switch-off when the first limit value is exceeded and the second limit value is not exceeded during the transient state.

17. The device of claim 16, wherein the protection unit comprises a computer and the safety-relevant operating parameter is one of: rotation speed of a shaft of the gas turbine plant, vibrations of a shaft of the gas turbine plant, amplitude and/or frequency of combustion chamber pulsations of the gas turbine plant, temperatures to which components of the gas turbine plant are exposed, and valve positions in combination with each other or with other operating parameters.

18. The device of claim 17, wherein the second limit value ensures that the gas turbine plant is subjected to an emergency switch-off by the protection unit on reaching a hazard potential that is classified as hazardous for surroundings of the gas turbine plant.

19. The device of claim 17, wherein the transient state is a state of the gas turbine plant in which the gas turbine plant is changed from a first operating state into a second operating state.

20. The device of claim 19, wherein the transient state occurs during a load change.

* * * * *